May 23, 1972     L. H. CHANT     3,664,706
EXHAUST DIVERTING VALVE FOR DUMPABLE
VEHICLES HAVING HEATED DUMP BODIES
Filed June 3, 1970     2 Sheets-Sheet 1
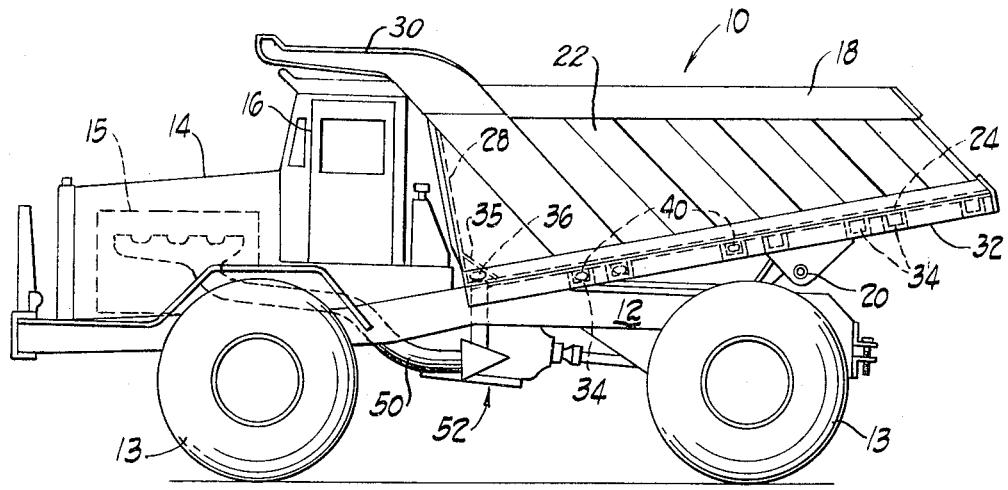
Fig. 1
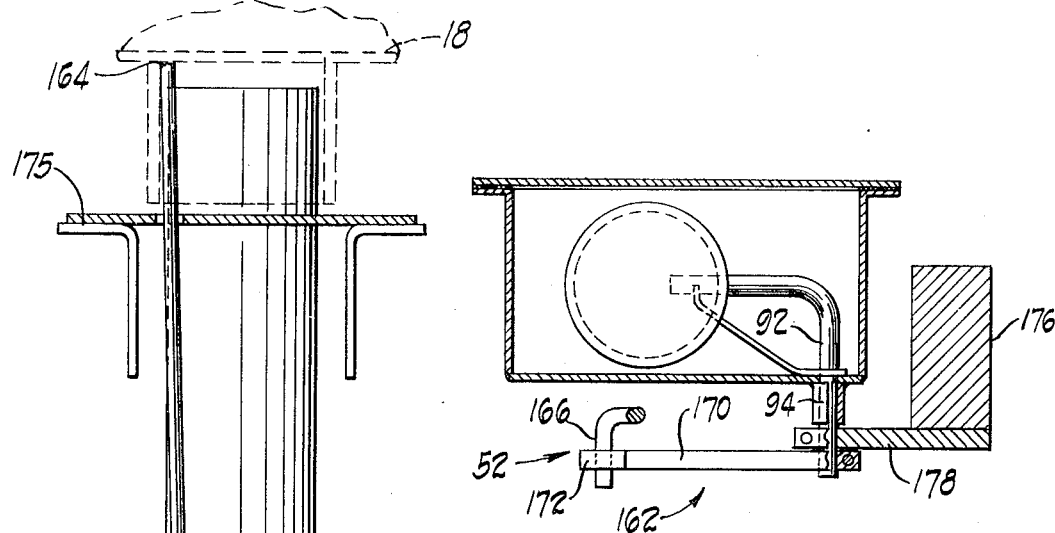
Fig. 5
Fig. 4
INVENTOR.
LEONARD H. CHANT
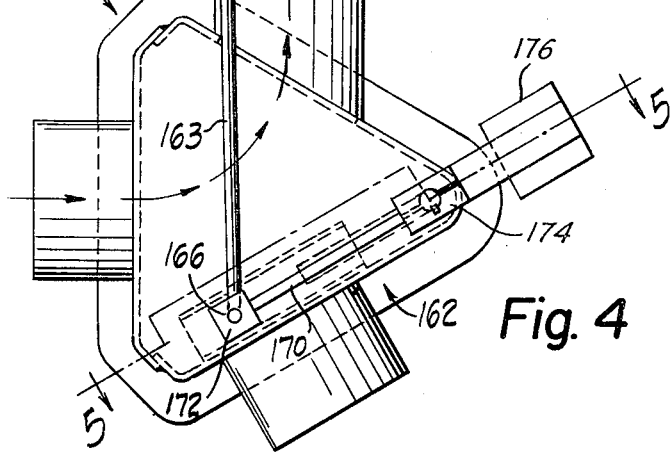
ATTORNEYS.

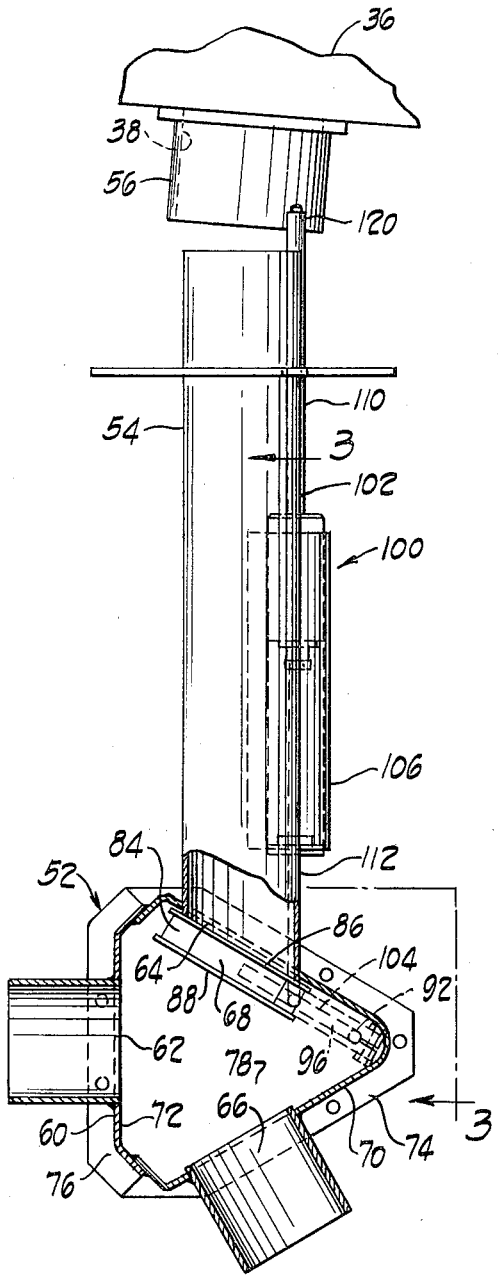

United States Patent Office 3,664,706
Patented May 23, 1972

3,664,706
EXHAUST DIVERTING VALVE FOR DUMPABLE
VEHICLES HAVING HEATED DUMP BODIES
Leonard H. Chant, Euclid, Ohio, assignor to
Euclid, Inc., Cleveland, Ohio
Filed June 3, 1970, Ser. No. 43,141
Int. Cl. B60h 1/18
U.S. Cl. 298—1 H                    6 Claims

ABSTRACT OF THE DISCLOSURE

A load carrying vehicle is disclosed which has an engine, an operator's cab, a dump body which is tiltable between a load carrying position and a dump position and an engine exhaust system communicating engine exhaust to the dump body for heating the dump body when in its load carrying position.

A diverter valve directs the engine exhaust gas to the dump body when the body is in its load carrying position and operates to direct exhaust gas to atmosphere away from the operator's cab when the dump body is in its dumping position. The diverter valve is operated by an actuator including a push rod operated by movement of the dump body to its load transporting position. The actuator also includes a spring which yields to limit the force applied to the valve by the push rod so that overtraveling of the rod does not damage the valve.

When the dump body is in its dump position, the valve member is biased to its other position. In one preferred form of the invention, a counterweight is included in the valve actuator for biasing a valve member. In another embodiment, the spring biases the valve member against the push rod.

CROSS REFERENCED PATENT

U.S. Letters Patent No. 3,462,187, issued Aug. 19, 1969 to John Hassler and assigned to Euclid, Inc.

BACKGROUND OF THE INVENTION

Field of the invention

The present invention relates to vehicles having dumpable load carrying bodies and more particularly relates to dumping vehicles in which the dump body is heated by engine exhaust gas to prevent freezing of the load in the body.

The prior art

Rear dumping trucks having heated dump bodies have been proposed in which engine exhaust gases flow through conduits in the dump body to heat the body. The gases entered the dump body at a location adjacent the truck operator cab. When the load was dumped, the end of the dump body adjacent the cab pivoted upwardly and away from the cab. In some prior art constructions, the engine exhaust was then directed upwardly into the atmosphere in the vicinity of the operator's cab. The exhaust gases frequently entered the operator's cab and were both irritating and somewhat hazardous to the operator of the truck.

To eliminate this condition it was proposed to employ a vane or valve-like member for diverting the flow of engine exhaust away from the operator's cab when the load was dumped.

Some proposals employed valve actuators having parts exposed to the flow of exhaust gas through the valve. Engine exhaust gases are often extremely hot and corrosive and tended to foul or corrode the valve actuating parts exposed to them.

Previously proposed devices have also relied on springs for maintaining the exhaust valve positioned to direct the exhaust into the dump body. Hence, the diverter valves have not been positively maintained in position. Moreover, these devices have been relatively complicated constructions and have lacked durability.

Where the prior art diverter valves were not positively actuated to the dump body heating positions, or were fouled and corroded from the engine exhaust, the engine exhaust could leak from the valve in the vicinity of the driver's cab. This resulted in the driver being exposed to undesirable fumes.

SUMMARY OF THE INVENTION

The present invention provides a rear dumping truck in which a new and improved engine exhaust valve construction directs exhaust into heating conduits of the dump body when the body is in its load carrying position and which diverts the exhaust gas away from the operator's cab when the body is in its dumping position.

In one preferred embodiment, the exhaust diverter valve includes a housing having an exhaust gas inlet and two exhaust outlets. One outlet opens in a vertical stack communicating with heating passageways in the dump body. The other outlet directs exhaust gas from the housing to the atmosphere downwardly and away from the operator's cab. A valve member is pivotally supported in the housing and is swingable from a heating position in which the second outlet is blocked and exhaust gases are directed to atmosphere through the second outlet.

The new valve further includes an actuator which positively operates the valve member to the heating position but which limits the force applied to the valve member so that excessive actuating forces are not applied to the valve member. The actuator includes a push rod which extends from the valve housing to the dump body. When the dump body is in its load carrying position, part of the body engages the push rod and forces the push rod to a position at which the valve member positively closes the diverting outlet in the valve housing. This assures that all of the exhaust flowing through the housing is directed into the dump body.

The force applied to the valve member by the push rod is limited so that should the push rod tend to overtravel in the valve closing direction, the valve member and associated parts are not damaged by excessive forces which might otherwise be applied.

In one preferred embodiment of the invention, the push rod comprises a collapsible push rod assembly formed by two rod members. One rod member is longitudinally movable relative to the other. The relatively movable rod is biased to a predetermined position relative to the other rod member by a spring which resists collapsing of the push rod assembly.

The dump body engages the push rod assembly and moves it to close the valve. Should the valve member seat before the push rod completes its travel, the biasing spring deflects to enable longitudinal relative movement between the push rod members. The total force applied to the valve member is thus limited by the biasing spring so that collapsing of the push rod protects the valve member against damage.

In another preferred construction, the push rod is a solid rigid member connected to the valve member by a spring device. The spring is preferably a leaf spring which forms a lever arm connecting the rod to the valve member. The spring deflects in response to push rod overtravel so that excessive forces are not applied to the valve member and associated parts.

When the dump body moves to its dumping position, the valve member moves to its diverting position at which the exhaust is directed away from the operator's cab. In one preferred embodiment, the valve member is moved to the diverting position by a return spring which acts on the push rod. In another preferred construction, the valve member is gravity biased to the diverting position by a counterweight connected to the valve member. This obviates the use of a return spring or springs.

An exhaust diverter valve constructed according to the invention does not subject parts of the valve actuator to exhaust gases and thus eliminates any tendency towards fouling or corrosion of these parts. The new diverter valve arrangement also provides for positive operation of the exhaust diverter valve yet insures against the valve being damaged due to the transmission of the excessive actuating forces.

A principal object of the present invention is the provision of a new and improved exhaust diverter valve for a dumpable vehicle which directs exhaust gas from the engine to the dump body when the dump body is carrying a load and which directs engine exhaust to atmosphere away from the operator's cab when the body is in its dumping position and which valve is of relatively simple durable construction, includes an actuator for positively operating the valve member and yet protects the valve member against application of excessive forces and which is not subject to corrosion and/or fouling due to contact with exhaust gases.

Other objects and advantages of the invention will become apparent from the following detailed description made with reference to the accompanying drawings which form a part of the specification.

BRIEF DESCRIPTION OF THE DRAWING

FIG. 1 is a schematic elevational view of a rear dumping vehicle embodying the present invention;

FIG. 2 is an elevational view of a portion of the vehicle shown in FIG. 1 and having parts illustrated in cross section;

FIG. 3 is an enlarged fragmentary view seen from the planes indicated by the lines 3—3 of FIG. 2;

FIG. 4 is an elevational view of another preferred exhaust diverting valve arrangement; and, FIG. 5 is a cross sectional view as seen from the plane indicated by the line 5—5 of FIG. 4.

DESCRIPTION OF A PREFERRED EMBODIMENT

A rear dumping vehicle 10 embodying the present invention is illustrated in FIG. 1. The vehicle 10 includes a frame 12 which is supported by ground engaging wheel assemblies 13. The vehicle 10 includes an engine compartment 14 housing an engine 15, an operator's cab 16 and a dump body 18 which is connected to the frame 12 by a pivot construction 20.

The dump body 18 is shown in its load carrying position. Suitable actuators are associated with the dump body for raising the forward end of the dump body and pivoting the body about the pivot connection 20 to dump over its load. The actuators for the dump body have not been illustrated and may be of any suitable construction. The dump body includes side walls 22, a floor 24, a front wall 28 and a cab guard 30 which extends forwardly of the front wall over the operator's cab 16.

The side wall 22 and floor 24 are joined by suitable corner beams 32 only one of which is shown. The floor 24 is supported by U-shaped stiffeners 34 which are welded to the underside of the floor 24 with their legs engaging the underside of the floor 24. The ends of the stiffeners 34 extend into the corner beams 32.

The dump body 18 is constructed to be heated by the exhaust from the engine 15 and thus includes a series of exhaust conduits for directing engine exhaust across the underside of the floor to heat the dump body. To this end the corner plate 35 is connected between the front wall 28 and the floor 24. The corner plate 35, floor 24 and front wall 28 thus form a conduit 36 through which engine exhaust enters th dump body through an exhaust inlet opening 38 (FIG. 2).

The corner beams form conduits or manifolds for the exhaust gases and these corner beam conduits communicate with the stiffeners 34 by way of holes 40 formed in the corner beams. The exact structure for heating the dump body is not essential to the present invention and body heating conduits different from those shown may be employed. The body heating system which is described above is illustrated and described in greater detail in the cross referenced Pat. No. 3,462,187 to Hassler and that patent should be referred to in connection with the details of the dump body construction.

Engine exhaust gases pass from the engine 15 through an exhaust conduit 50, an exhaust diverter valve arrangement 52, a vertical pipe 54 and through the opening 38 via a cylindrical fitting 56 which extends about the end of the pipe 54.

The exhaust valve 52 controls the flow of exhaust through the exhaust system of the vehicle. The valve 52 directs exhaust gas into the dump body heating conduit when the dump body is in the load transporting position and diverts the exhaust downwardly and rearwardly of the vehicle when the dump body is in its dumping position.

The valve 52 includes a valve body 60 having an exhaust inlet port 62 and exhaust outlet ports 64, 66. The porting for the body is illustrated in FIG. 3. A swing valve member 68 is supported in the body 60 and is movable between the ports 64, 66. When the valve member covers the outlet port 66, the port 64 is open and exhaust gas flows to the dump body. This position of the valve member 68 is referred to as the open position.

When the valve body covers the exhaust outlet port 64, the port 64 is closed and the exhaust is directed from the valve body to atmosphere through the outlet port 66. This position of the valve member is referred to as the closed position.

The valve body 60 includes a generally V-shaped sheet metal wall member 70 and a second wall member 72 which extends across the legs of the V-shaped member and is attached to the wall member 70 by suitable welds. Flanges 74, 76 extend outwardly from the edges of the wall members 70, 72, respectively, at one side of the body 60. End plates 78, 80 extend across the open sides of the valve body. The end plate 78 is bolted to the flanges 70, 72 to close the valve housing on one side and to provide a mounting flange structure by which the valve is supported on the vehicle frame. The end plate 80 is fixed to the wall members 70, 72 on the opposite side of the valve body 60.

The inlet port 62 is formed in the wall member 72. The exhaust outlet ports 64, 66 are formed in the legs of the V-shaped wall member 70.

The valve member 68 includes a cylindrical body member 84 having opposed planar seating faces 86, 88. The body member 84 is swung between its open and closed positions by a rock shaft 92 which extends into the body 60 through a bearing support 94. The axis of the shaft 92 extends transversely of the body 60 adjacent the apex of the V-shaped wall member 70. The member 84 is attached to a bent crank arm portion 96 of the rock shaft. The crank arm portion 96 is of sufficient length that the face 86 of the valve member seats the outlet port 64 when the valve member is in the position illustrated in FIG. 3. The face 88 seats over the outlet port 66 when the valve body is swung from its FIG. 3 position clockwise about the axis of the rock shaft. A strap 98 extends between the member 84 and a location on the rock shaft adjacent the end plate 80 of the valve housing to insure that the valve member 68 is prevented from rotating about the axis of the crank arm portion 96.

The valve member 68 is operated between its open and closed positions in response to the position of the dump body relative to the frame by an actuator 100. The actuator 100 includes a push rod assembly 102 connected to the rock shaft 92 by a crank arm 104. The push rod assembly 102 extends adjacent the vertical exhaust pipe 54 through a tubular support housing 106 which is attached to the pipe 54.

The assembly 102 is a two part collapsible push rod including a first part formed by a sleeve member 110 and a second push rod part formed by a rod 112. The sleeve 110 and rod 112 are connected together by a lost motion construction 114 which enables the sleeve 110 to move longitudinally relative to the rod 112. A return spring 116 is connected between the push rod assembly and the support housing 106 for biasing the push rod assembly upwardly as viewed in FIGS. 2 and 3 to close the valve.

The sleeve 110 includes a closed end 120 which is engageable with the dump body of the vehicle when the dump body is in its load transporting position. The opposite opened end 122 of the sleeve 110 is freely slidable on an end 124 of the rod 112. The sleeve is thus capable of moving relative to the rod along the axis of the push rod assembly. The lost motion construction 114 includes a compression spring 130 for urging the sleeve 110 away from the rod 112. The spring 130 is confined between spring seats 132, 134. The spring seat 132 is formed by a welded flange carried on the sleeve 110. The spring seat 134 is defined by a spring follower body 136 which is threaded to the rod 112 and locked in position by a lock nut 140.

The spring follower body 136 carries a cylindrical tube which surrounds the spring 130. A flange 144 connected at the end of the tube projects inwardly and forms stops for the spring seat 132. This prevents the sleeve 110 from being pushed off the rod 112 by the compression spring 130.

The return spring 116 engages the follower body 136 and urges the body upwardly as seen in FIGS 2 and 3. The return spring 116 is compressed between the follower body and a spring seat 150 which is formed in the housing 106. The return spring 116 resists downward movement of the push rod assembly 102 so that the valve 68 is biased towards its closed position.

Because of the construction of the diverter valve and its inclusion in the vehicle exhaust system, it is not possible to maintain accurate dimensional relationships and tolerances between various parts of the vehicle and the diverter valve. On the other hand, substantially all of the engine exhaust should be channeled through the dump body to insure adequate heating of the dump body. For this reason, the exhaust diverter valve should be positively actuated to its open position and maintained fully open at all times when the dump body is in its load transporting position. It is also essential that the push rod be unable to transmit excessive forces to the valve member which would otherwise damage the valve or parts associated with it.

The lost motion structure 114 of the push rod assembly permits the valve member to be positively actuated to its open position. This structure also maintains the valve open regardless of vibrations or relative motion between various parts of the assembly vehicle limiting the total force transmitted by the push rod to the valve. The valve and associated components are thus protected against damage as a result of overtravel of the push rod assembly.

The spring constant, or spring rate, of the compression spring 130 is significantly greater than the spring rate of the return spring 116. Consequently, as the dump body is lowered to its load transporting position the dump body engages the end 120 of the sleeve 110 and urges the entire push rod assembly 102 downwardly against the bias of the return spring 116. During this movement of the push rod assembly, the spring 130 remains substantially undeflected.

The length of the push rod assembly 102 and the crank arm 104 are such that the valve body 84 is moved to close the outlet port 66 before the dump body is moved completely to its load transporting position. Hence, the dump body continues to exert a downward force on the push rod assembly 102 when the valve body 84 is fully open so that the push rod tends to overtravel. As the push rod is acted upon by the dump body, the spring 130 is deflected. Thus, the force transmitted by the push rod to the valve during this period of overtravel is limited by the spring 130. The valve is positively maintained in its open position and yet the forces applied to the valve are insufficient to cause damage.

FIGS. 5 and 6 show an exhaust diverter valve arrangement which directs exhaust gas into the dump body when the dump body is in its load transporting position and wherein the valve member is gravity biased to its exhaust diverting position. The valve body and valve member are substantially the same as the valve body 60 and valve member 68 described above in reference to FIGS. 1–3. The valve shown in FIGS. 5 and 6 is therefore not described in detail and parts similar to the parts described above in reference to FIGS. 2 and 3 are designated by corresponding reference characters.

The valve 52 of FIGS. 4 and 5 is operated between its open and closed positions by an actuator assembly 162. The actuator assembly 162 includes a rigid push rod 163 having an upper end 164 engaged by the dump body 18 when the dump body is in its load transporting position. FIG. 5 shows a portion of the dump body 18 in broken lines and in its load transporting position.

The lower end 166 of the push rod is connected to the rock shaft 92 by a crank arm 170. The crank arm 170 is fromed by a cantilevered leaf spring. The end 166 of the push rod is defined by a right angle bend which is rotatably connected to the projecting end of the spring 170 by a bearing 172. The bearing 172 enables relative rotation between the lower end of the push rod and the spring as the push rod moves up and down.

The spring 170 is fixed to a spring support member 174. The support member 174 is keyed to the rock shaft 92 so that the spring transmits motion to the rock shaft from the push rod.

The uper end of the push rod extends through a guide plate 175 located near the upper end of the vertical exhaust pipe 54. The guide plate allows the push rod to freely move vertically relative to the exhaust pipe 54 and prevents vertical misalignment of the push rod.

When the dump body 18 moves to its dumping position the valve 52 is closed by a counterweight 176. The counterweight 176 is carried by an arm 178 which is keyed to the rock shaft 92 so that relative rotation between the counterweight 176 and the rock shaft is prevented. The spring 170 has a sufficiently large spring constant that the counterweight 176 is ineffective to deflect the spring appreciably when the valve member is in its open position.

Because of the noted dimensional instability between parts of the exhaust system, the push rod 163 and spring 170 are dimensioned so that the dump body drives the push rod downwardly beyond the position at which the valve 52 is fully opened. The spring 170 deflects as the push rod overtravels this position and thus limits the force transmitted to the valve and the associated parts by the push rod. Hence, the valve is maintained positively opened yet the force applied to the valve is limited so that the valve is not damaged.

When the dump body moves to the dumping position, the counterweight swings the rock shaft 92 clockwise as viewed in FIG. 4 resulting in the push rod 163 being moved upwardly by the spring 170. The valve 52 is simultaneously closed.

Although two preferred construction of the present invention have been illustrated and described in considerable detail, the present invention is not to be considered to the precise constructions shown. It is intended to cover hereby all adaptations, modifications and uses of the present invention which come within the scope of the appended claims.

What is claimed is:

1. In a load carrying vehicle having an engine, an operator's cab, a dumpable body movable between a first load carrying position and a second load dumping position, and structure for directing engine exhaust to said dump body for heating said dump body including an exhaust diverter valve comprising:
- (a) a valve body having an exhaust inlet and first and second outlets;
- (b) an exhaust pipe connected to said first outlet for communicating exhaust gas from said valve body to said dump body, said second outlet directing exhaust gas from said valve body to the atmosphere and away from said cab;
- (c) a valve member movable between a first position in which said first outlet is blocked so that exhaust flows through said second outlet, and a second position in which said second outlet is blocked so that exhaust flows through said first outlet; and,
- (d) an actuator for moving said valve member between said positions in response to positioning of said dump body, said actuator comprising:
  - (1) a push rod comprising first and second push rod members drivingly connected to said valve member for moving said valve member to close one of said outlets when said dump body is in its first position;
  - (2) said first push rod member comprising a sleeve portion receiving a part of said second push rod member with said push rod members being relatively movable in the direction of travel of the push rod;
  - (3) yieldable means for limiting the force applied to said valve member by said push rod when said push rod continues to move after said valve member has closed said outlet, said yieldable means comprising a spring acting to urge said push rod members apart and resisting relative movement between said push rod members; and,
  - (4) stop means for preventing removal of said first push rod member from said second push rod member.

2. In a load carrying vehicle having an engine, an operator's cab, a dumpable body movable between a first load carrying position and a second load dumping position, and structure for directing engine exhaust to said dump body for heating said dump body including an exhaust diverter valve comprising:
- (a) a valve body having an exhaust inlet and first and second outlets;
- (b) an exhaust pipe connected to said first outlet for communicating exhaust gas from said valve body to said dump body, said second outlet directing exhaust gas from said valve body to the atmosphere and away from said cab;
- (c) a valve member movable between a first position in which said first outlet is blocked so that exhaust flows through said second outlet, and a second position in which said second outlet is blocked so that exhaust flows through said first outlet; and,
- (d) an actuator for moving said valve member between said positions in response to positioning of said dump body, said actuator comprising:
  - (1) a push rod drivingly connected to said valve member for moving said valve member to close one of said outlets when said dump body is in its first position; and,
  - (2) yieldable means for limiting the force applied to said valve member by said push rod when said push rod continues to move after said valve member has closed said outlet;
  - (3) said yieldable means comprising a leaf spring having one end connected to said push rod and a second end connected to said valve member whereby said push rod operates said valve member through said leaf spring.

3. A vehicle as claimed in claim 2 and further including a counterweight connected to said valve for moving said valve to close the other of said outlets when said dump body is away from its first position.

4. In a load carrying vehicle having an engine, an operator's cab and a dumpable body which is heated by exhaust from an engine of the vehicle; an exhaust diverter valve for directing engine exhaust gases to said dump body when said body is in a load carrying position and for directing engine exhaust gases to atmosphere away from the operator's cab when said body is in a dumping position, said diverter valve comprising:
- (a) a valve body having an exhaust gas inlet and first and second outlets;
- (b) a valve member connected to said valve body by a rock shaft supported by said valve body, said valve member movable between a position in which said first outlet is covered and a position in which said second outlet is covered; and,
- (c) means for actuating said valve member between said positions including a push rod drivingly connected to said rock shaft by a crank arm, said push rod engaged by said dump body when said dump body is in the load carrying position to maintain said valve member in one position;
- (d) said crank arm formed at least in part by yieldable means comprising a leaf spring cooperating with said push rod for deflecting to enable movement of said push rod relative to said valve member when said valve member is in said one position.

5. In a load carrying vehicle having an engine, an operator's cab and a dumpable body which is heated by exhaust from an engine of the vehicle; an exhaust diverter valve for directing engine exhaust gases to said dump body when said body is in a load carrying position and for directing engine exhaust gases to atmosphere away from the operator's cab when said body is in a dumping position, said diverter valve comprising:
- (a) a valve body having an exhaust gas inlet and first and second outlets;
- (b) a valve member connected to said valve body by a rock shaft supported by said valve body, said valve member movable between a position in which said first outlet is covered and a position in which said second outlet is covered; and,
- (c) means for actuating said valve member between said positions including a push rod drivingly connected to said rock shaft by a crank arm, said push rod engaged by said dump body when said dump body is in the load carrying position to maintain said valve member in one position;
- (d) said crank arm formed at least in part by yieldable means cooperating with said push rod for deflecting to enable movement of said push rod relative to said valve member when said valve member is in said one position; and,
- (e) a counterweight connected to said rock shaft for moving said valve member to said other position when said dump body is away from said load carrying position.

6. A vehicle as claimed in claim 5 wherein said counterweight is ineffective to substantially deflect said yieldable means.

References Cited
UNITED STATES PATENTS

| 3,039,493 | 6/1962 | Licari | 298—1 H |
| 2,461,313 | 2/1949 | Davis | 251—80 X |
| 2,812 | 10/1842 | Chapman | 251—338 |

BENJAMIN HERSH, Primary Examiner

J. A. PEKAR, Assistant Examiner

U.S. Cl. X.R.

137—612; 180—64 A; 251—81, 338